United States Patent
Ferguson et al.

(10) Patent No.: US 9,798,537 B2
(45) Date of Patent: Oct. 24, 2017

(54) ISOLATING APPLICATIONS WITH A SEGMENTED ARCHITECTURE

(71) Applicant: MASTERCARD INTERNATIONAL INCORPORATED, Purchase, NY (US)

(72) Inventors: Douglas Paul Ferguson, Richmond Heights, MO (US); Weihua Zhou, Chesterfield, MO (US); Uday Kumar Survi, Dardenne Prarie, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/853,695

(22) Filed: Sep. 14, 2015

(65) Prior Publication Data
US 2017/0075684 A1    Mar. 16, 2017

(51) Int. Cl.
*G06F 9/45* (2006.01)
*G06F 9/44* (2006.01)
*G06F 9/54* (2006.01)

(52) U.S. Cl.
CPC . *G06F 8/70* (2013.01); *G06F 9/54* (2013.01)

(58) Field of Classification Search
None
See application file for complete search history.

(56) References Cited

U.S. PATENT DOCUMENTS

| 9,405,515 B1* | 8/2016 | Bertram .............. G06F 8/41 |
| 2005/0246718 A1 | 11/2005 | Erlingsson et al. |
| 2006/0277539 A1* | 12/2006 | Amarasinghe ...... G06F 21/53 717/168 |
| 2012/0174124 A1 | 7/2012 | Ward et al. |

FOREIGN PATENT DOCUMENTS

JP    2001-154831 A    6/2001

OTHER PUBLICATIONS

Patent Cooperation Treaty, International Search Report for PCT/US2016/051592, Dec. 6, 2016, pp. 1-4.

* cited by examiner

*Primary Examiner* — Chuck Kendall
(74) *Attorney, Agent, or Firm* — Sheppard, Mullin, Richter & Hampton LLP (57) ABSTRACT

An operationally monolithic application is provided, where the application resides in a first program address space of an application server. The application calls to an application component residing in a second program address space of the application server, the application component being built upon a framework of the operationally monolithic application. The operationally monolithic application loads at least a first library upon which it depends to invoke a first method, and the application component loads at least a second library upon which it depends to invoke a second method. The first and second libraries can co-exist on the application server despite being different versions of the same libraries.

17 Claims, 6 Drawing Sheets

ISOLATING APPLICATIONS WITH A SEGMENTED ARCHITECTURE

TECHNICAL FIELD

The present disclosure is generally related to application architectures. More particularly, the present disclosure is directed to systems and methods for creating a segmented application architecture that isolates applications from libraries.

BACKGROUND

Applications utilized by industry entities, businesses, and the like may often rely on or are built on top of third-party vendor frameworks. Such third-party vendor frameworks, as utilized in this context, can refer to a software framework used, e.g., by software developers to implement a standard application structure. That is, software may be abstracted to a level such that generic functionality can be provided to software developers. This generic functionality can then be added to, customized, adapted, or otherwise changed to suit the needs and/or requirements of those software developers creating applications for the industry entities, businesses, etc.

In particular, a software framework may be thought of as a universal, reusable software environment that provides certain functionality as part of a larger computing environment (e.g., hardware, operating system, runtime libraries, etc.) The software framework can facilitate the development of applications, products and/or software solutions. Software frameworks may include, e.g., support programs, compilers, code libraries, tool sets, and application programming interfaces (APIs).

SUMMARY

In accordance with one embodiment of the present disclosure, a method comprises calling, by an operationally monolithic application residing in a first program address space of an application server of a non-transitory computer-readable medium, to an application component residing in a second program address space of the non-transitory computer-readable medium. The method further comprises loading, by the operationally monolithic application, at least a first library upon which it depends to invoke a first method. Further still, the method comprises loading, by the application component, at least a second library upon which it depends to invoke a second method.

In accordance with another embodiment of the present disclosure, a non-transitory computer-readable medium having computer executable program code embodied thereon, the computer executable program code configured to cause a computer system to: execute an operationally monolithic application residing in a first program address space of the non-transitory computer-readable medium. Executing of the operationally monolithic application comprises: calling to an application component residing in a second program address space of the non-transitory computer-readable medium; loading, by the operationally monolithic application, at least a first library upon which it depends to invoke a first method; and loading, by the application component, at least a second library upon which it depends to invoke a second method.

In accordance with yet another embodiment of the present disclosure, an application server comprises a memory unit comprising at least a first program address space and a second program address space. The application server further includes a vendor application, wherein the vendor application is dependent upon a first version of a library. Further still, the application server comprises a customized application component, wherein the customized application component is dependent upon a second version of the library, and wherein the vendor application calls the customized application component via inter-process communication during execution.

BRIEF DESCRIPTION OF THE DRAWINGS

Further aspects of the present disclosure will be more readily appreciated upon review of the detailed description of its various embodiments, described below, when taken in conjunction with the accompanying drawings.

The drawings are described in greater detail in the description and examples below. The drawings are not intended to be exhaustive or to limit the various embodiments to the precise form disclosed. It should be understood that embodiments can be practiced with modification and alteration.

DETAILED DESCRIPTION

The details of some example embodiments of the methods and systems of the present disclosure are set forth in the description below. Other features, objects, and advantages of the disclosure will be apparent upon examination of the following description, drawings, examples and claims. It is intended that all such additional systems, methods, features, and advantages be included within this description, be within the scope of the present disclosure, and be protected by the accompanying claims.

As alluded to above, entities may build applications on top of third-party vendor frameworks. By using such frameworks, these applications can be customized to the entities' needs and/or requirements. One example of an industry in which applications may be built on top of third-party vendor frameworks is the payment transaction processing industry. Transaction processing of card-based payments can include both an authorization side and a clearance side. The authorization side may involve the process of confirming that a cardholder has a sufficient line of credit to cover a proposed payment. The clearance side of the transaction may involve the process of moving funds from an issuing bank to an acquiring merchant bank.

In the context of payment transaction processing, large numbers and/or batches of files and data (e.g., money files, rewards files, settlement clearing data, etc.) may be transferred between the payment network and its customers (e.g., to and from banks, merchants, etc.) as will be described in greater detail below. In order to effectuate the transfer of these files, an entity such as the payment network itself may customize web applications, proprietary frameworks/software such as secure transport managed file transfer software (MFTS). Given this reliance upon third-party vendor frameworks, any mismatch or disparity between one or more libraries utilized by the third-party vendor framework and any customizations to the framework can result in inoperative functionality/systems.

As will be discussed below, an application architecture is provided such that particular libraries used in third-party vendor frameworks and those used in entity-application development can be kept separate. That is, the application architecture in accordance with various embodiments isolates an application from the vendor framework. This allows for the concurrent use of different library versions (that utilized by the third-party vendor/vendor framework and that used by the application), thereby eliminating "collisions" between application and framework components.

Figure 1:
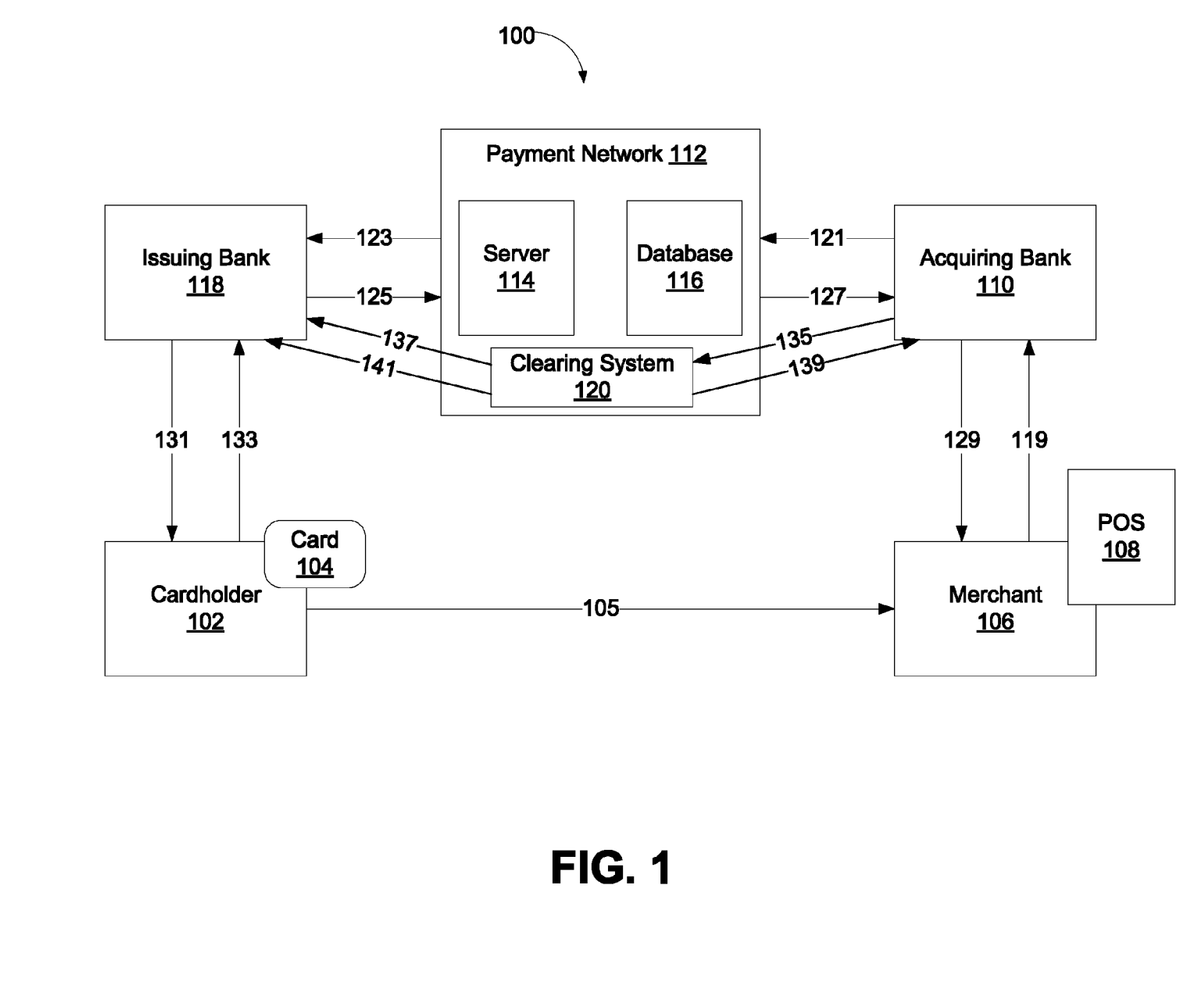
FIG. 1 illustrates an example payment card transaction processing system.

An example of a network and contextual environment in which various embodiments may be applicable will be illustrated and described. FIG. 1 depicts an example payment card transaction processing system 100 in which an application having a segmented architecture may be implemented in accordance with various embodiments.

In a typical card-based payment transaction system, a cardholder 102 presents a credit/debit/prepaid card 104 to a merchant 106 for the purchase of goods and/or services. This transaction is indicated by arrow 105. A "card" 104, as used herein, can refer to a conventional magnetic-stripe credit, debit card, or similar proximity payment device (utilized on its own or incorporated into another device such as a mobile telephone, personal digital assistant (PDA), etc.) having near field communications (NFC) capabilities, such as a radio frequency identification (RFID) chip implemented therein. A "card" can further refer to virtual or limited use account numbers and electronic wallets.

It is understood that prior to the occurrence of such a transaction, cardholder 102 was issued card 104 by an issuing bank 118. Moreover, it will be understood that merchant 106 has established a relationship with an acquiring bank 110, thereby allowing merchant 106 to receive payment cards as payment for goods and/or services. That is, merchant banks and issuing banks may participate in various payment networks, including payment network 112. One such payment network is the one operated by MasterCard International Incorporated, the assignee of the present disclosure.

After presentation of payment card 104 to merchant 106 by cardholder 102, merchant 106 may send an authorization request (indicated by arrow 119) to acquiring bank 110 via a point-of sale (POS) terminal 108 located at or otherwise controlled by merchant 106. In turn, acquiring bank 110 communicates with payment network 112 (indicated by arrow 121), and payment network 112 communicates with issuing bank 118 (indicated by arrow 123) to determine whether issuing bank 118 will approve the transaction 105 that cardholder 102 is attempting to make. An approval or disapproval of the authorization request is thereafter transmitted back to merchant 106 (indicated by arrows 125, 127 and 129). Merchant 106 may then either complete or cancel transaction 105 based upon the response to the authorization request.

If transaction 105 is approved, the transaction amount will be sent from issuing bank 118 through payment network 112 to acquiring bank 110. The transaction amount, minus certain fees, will thereafter be deposited within a bank account belonging to merchant 106. Issuing bank 118 may then bill cardholder 102 (indicated by arrow 131) for the transaction amount by sending a periodic cardholder statement. Cardholder 102 follows by submission of payment(s) (as indicated by arrow 133) to issuing bank 118. This submission of payment(s) (as indicated by arrow 133) by cardholder 102 may be automated (e.g., in the case of debit transactions), may be initiated by cardholder 102 for the exact amount matching the total cost of all purchases during the statement period (e.g., charge cards or credit balances paid in full), and/or may be submitted (in part or in whole) over a period of time that thereby reflects the costs of the purchases plus any financing charges agreed upon beforehand between cardholder 102 and issuing bank 118 (e.g., revolving credit balances).

Payment network 112 preferably includes at least one server 114 and at least one database 116. Server 114 may include various computing devices such as a mainframe, personal computer (PC), laptop, workstation or the like. Server 114 can include a processing device and be configured to implement an authorization and clearance process, which can be stored in computer storage associated with server 114. Database 116 may include computer readable medium storage technologies such as a floppy drive, hard drive, tape drive, flash drive, optical drive, read-only memory (ROM), random access memory (RAM), and/or the like. Server 114 and database 116 may be controlled by software/hardware and may store data to allow it to operate in accordance with aspects of the present disclosure.

POS terminal 108 is in data communication, directly or indirectly, and at least from time to time, with, e.g., an acquirer host computer (not shown) that is part of payment network 112 and is operated for or on behalf of acquiring bank 110, which handles payment card transactions for merchant 106. Server 114 may be operated by or on behalf of the payment network 112, and may provide central switching and message routing functions among the member financial institutions of the payment card association. Issuing bank 118 also preferably makes use of an issuer host computer (not shown), and an access point (not shown) via which the issuer host computer exchanges data messages with server 114. It should be noted that in practice, payment card transaction processing system 100 may involve a large number of cardholders, POS terminals, acquirer host computers, issuer host computers, and access points. In general, the acquirer host computer can receive authorization requests from POS terminals, forward the authorization requests through payment network 112, receive authorization responses, and relay the authorization responses to POS terminal 108. Moreover, the issuer host computer may in general, receive authorization requests from server 114 and transmit authorization responses back to server 114 with respect to the authorization requests.

The use of payment cards for a broad spectrum of cashless transactions has become ubiquitous in the current economy, accounting for hundreds of billions of dollars in transactions during a single year. For example, MasterCard International Incorporated processes upwards of 160 million transactions per hour in over 230 countries. It should be appreciated that the amount of information and resources (e.g., technology assets) involved in performing and coordinating payment transactions, at any point in payment card transaction processing system 100 is enormous.

A payment network may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include gift cards, personalized gift cards, payment cards, letters of credit, checks, financial accounts, etc. Accordingly, a payment network relies on variety of resources, such as various hardware and/or software platforms, databases, internal networks, etc.

To carry out a straight transfer of a file from one party to another, Global File Transfer (GFT) takes advantage of in-place connectivity and does not offer the transfer protocol (FTP) services. A straight transfer may be carried out because of a relationship with a member and a vendor/third party. As will be appreciated by those of ordinary skill in the art, GFT is a system available from MasterCard International Incorporated wherein files are transferred over a payment network of the kind shown in FIG. 1, and is a non-limiting example of data the transfer via a payment network. FTP is the standard network protocol used to exchange and manipulate files over an Internet Protocol computer network, such as the Internet, FTP tale transfer can be employed in other embodiments of the invention. Appropriate the retention and/or billing policies can be set within the GFT network or other network(s).

There are a number of methods of passing a file through a payment system; for example: a virtual private network (VPN) or the Internet—using a suitable secure technique for communicating data over the Internet, for example, an existing, method such as MasterCard international incorporated's MFE (MASTERCARD FILE EXPRESS) or the well-known secure the transfer protocol (SFTP) technique or similar techniques. As will be appreciated by those of ordinary skill in the art, the same are generally representative of so-called Straight-Through-Processing (STP) techniques which enable electronic payments to flow seamlessly from, for example, a company's Accounts Payable system, through the banking infrastructure, and to a vendor's Accounts Receivable system, Note that in at least some instances, STP techniques can also be employed in connection with the above-discussed VPN file transfer. An STP Transaction Set was developed by the Electronic Payments Network and represents a widely adopted standardized format that may be employed in one or more embodiments. Those of ordinary skill in the art will also appreciate that MasterCard File Express is an example of an application (accessible online) which handles both the compression and encryption of data for transmission.

The encryption of data is one such feature/application/service that may be customized based on a vendor framework/product. For example, a payment network may implement pretty good privacy (PGP) data encryption and decryption for providing cryptographic privacy and authentication for data communications, such as that described previously. This can be applied "in flight" to any data or file being transferred to and from payment network 100.

Figure 2:
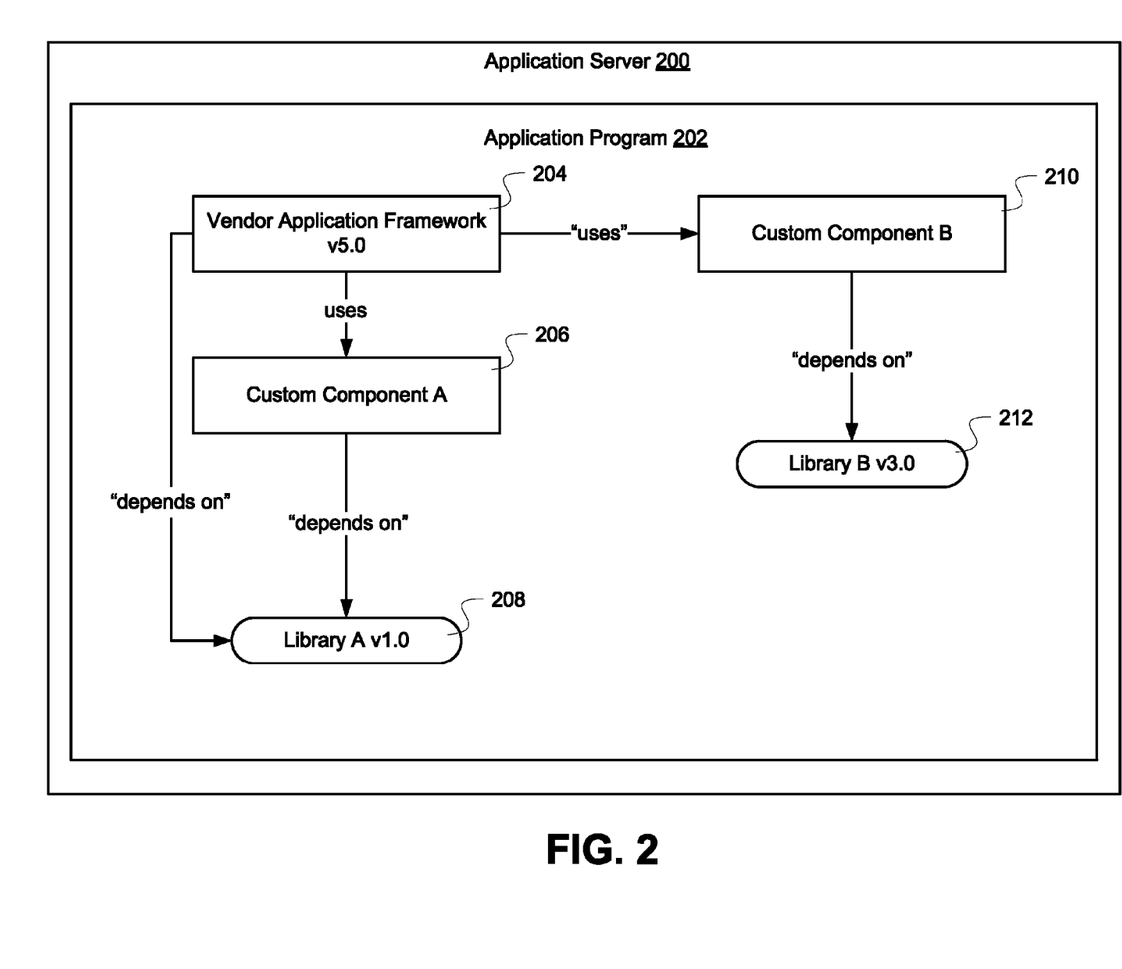
FIG. 2 illustrates an example of a conventional monolithic architecture supporting existing application functionality.

FIG. 2 illustrates an example application program (202) architecture as is conventionally realized. Application program 202 may reside on an application server 200. Application 202 may include one or more components, such as the vendor application framework 204. Vendor application framework 204, for the sake of providing an example, may be a secure transport vendor application framework, which, again for sake of providing an example, may be version 5.0 of the framework. As discussed previously, vendor application framework 204 may provide certain generic file transport functionality to an entity that is controlling/operating payment card transaction processing system 100 and/or payment network 112 of FIG. 1.

In order to achieve the requisite functionality desired within payment card transaction processing system 100, custom features may be built/based on vendor application framework 104. As originally provided, vendor application framework 104 may have built thereon, a custom software application component A (206) that depends on library A v1.0 (208). Custom software application component A may be, in the file transfer context, a custom file validation component that can be used for, e.g., validating/authenticating the content(s), origin, etc. of a file(s) to be transferred within payment card transaction processing system 100 (e.g., between one of merchant 106, issuing bank 118, acquiring bank 110, and payment network 112). Custom component B (210) may be another aspect of application program 202. In accordance with one embodiment, custom component B (210) may be a custom encryption component that depends upon another library, i.e., library B v3.0 (212), utilized for encrypting transferred files within payment transaction processing system 100.

Custom software components A (206) and B (210) may be aspects of application program 202 (which may also be written in Java). Java is a high-level, object-oriented language that is platform-agnostic. That is, programs written in Java can be compiled by a Java compiler into Java bytecode. Once the Java program is compiled, it is interpreted by a special-purpose machine, Java Virtual Machine (JVM), running on a platform so that the program can be executed on the platform without the program having to be written using, e.g., the "native" machine code/language of the platform. Once a Java program is interpreted by the JVM (a simulated machine) into Java bytecode, the bytecode may then run and the JVM passes processing work to one or more of the platform processors in its own language. The JVM and libraries make up what is commonly referred to as the Java Runtime Environment (JRE).

As alluded to above, Java is an object-oriented language, which means that the code is associated with a class of objects. An object is a simulated data structure which behaves according to the specifications of its class—the act of making Java code involves creating and altering these classes. Specific class behaviors are defined by snippets of code called "methods," and properties of objects and classes are defined by "variables."

Regarding most modern operating systems (OSs), a large body of reusable code is provided to simplify a developer's job. This code is typically provided as a set of dynamically loadable libraries that applications can call at runtime. Because the Java platform is not dependent on any specific OS, applications cannot rely on any of the pre-existing OS libraries. Instead, the Java platform provides a comprehensive set of its own standard class libraries containing much of the same reusable functions commonly found in modern operating systems. Most of the system library is also written in Java.

The Java class libraries serve a few purposes. Like other standard code libraries, Java libraries provide a developer with well-known sets of functions to perform common tasks, such as maintaining lists of items or performing complex string parsing. Second, the class libraries provide an abstract interface to tasks that would normally depend heavily on the hardware and operating system. Tasks such as network access and file access are often heavily intertwined with the distinctive implementations of each platform. Java's functionality comes from its application programming interface (API), which is automatically included with its developer environment. It can handle complex data structures, sorting algorithms, networking protocols, classes and methods to create graphical user interfaces, and more. There can be multiple versions of such libraries in existence, and newer versions of libraries may change, add, or remove classes from the older versions. Developers may select which version of a library they want their program to rely upon when creating the program.

Changes in library selection by the third-party vendor can have an immediate and significant (deleterious) impact to any already-developed applications (e.g., applications that have been developed based on existing libraries/library versions, such as illustrated in FIG. 2 and described above. For example, during a technical refresh, the third-party vendor framework may be updated by the vendor. It may be that the vendor implements a new function/feature that relies on the same library(ies) relied upon by one or more other customized aspects. In the event that the vendor chooses to rely on a different version of that same library(ies), an incompatibility arises. For example, and in the context of custom component A (206) and custom component B (210), it may be that the vendor releases its own encryption capabilities that rely on library A (208) and library B (212). However, vendor may have chosen to use a version of library A (208) and library B (212) that is not the same (either earlier or later) than the versions currently used by custom components A and B. Should this occur, any attempt to load either library A (208) or library B (212) (by custom component A (206) or custom component B (210), respectively) to make a call, the vendor-selected library may no longer have the requisite methods and/or classes relied upon by custom component A (206) and custom component B (210). Even if an entity were to attempt to, e.g., replace the libraries used by the vendor with library A (208) and library B (210), it may be that the vendor-implemented encryption capabilities rely on methods/classes that no longer exist in library A (208) and library B (210)

Figure 3:
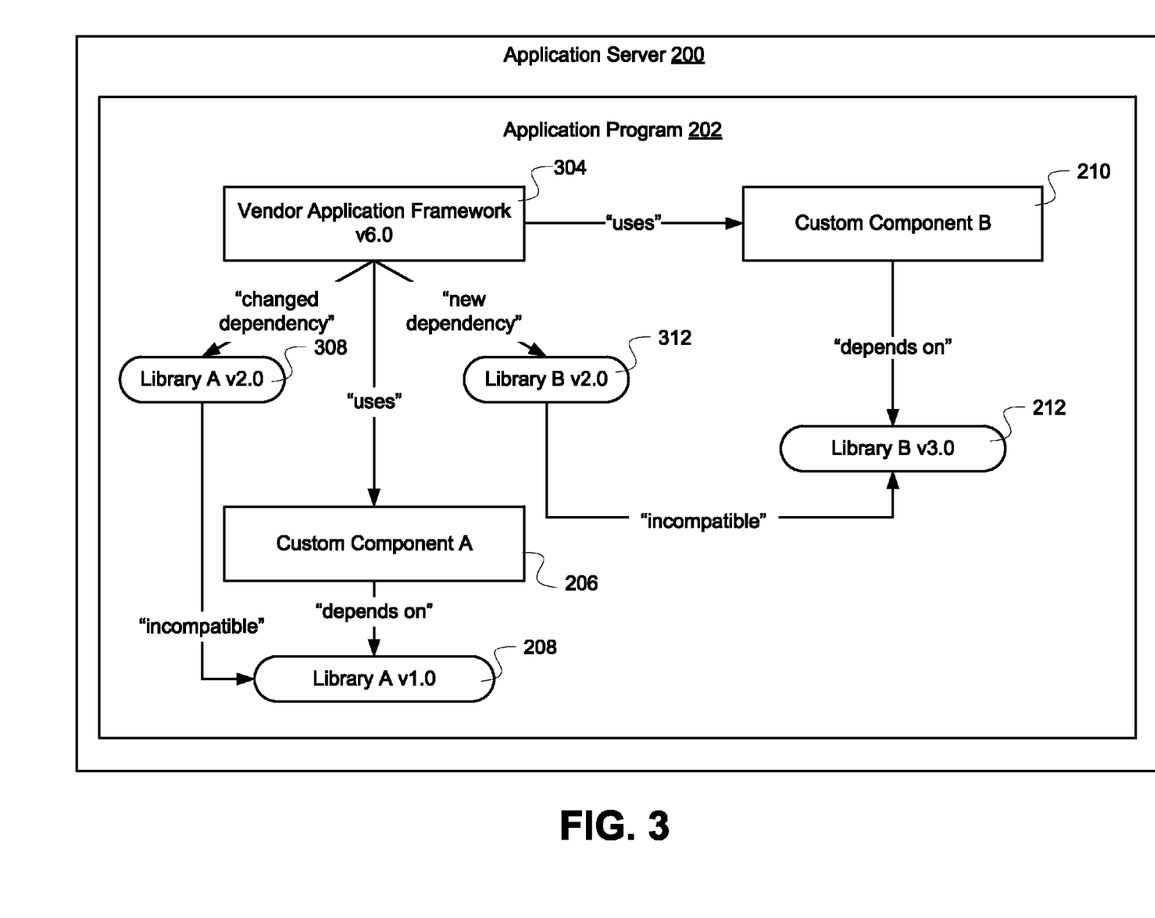
FIG. 3 illustrates an example of the conventional monolithic: architecture of FIG. 2 in a non-functional state after applying a vendor upgrade.

FIG. 3 illustrates an example use case scenario in which a mismatch between libraries occurs. Again, application program 202 may reside on application server 200, and may be include one or more components, such as vendor application framework 204. Vendor application framework may be, e.g., a secure transport vendor application framework. The operative version of vendor application framework 204 may be version 5.0. As before, vendor application framework 204 may provide certain generic file transport functionality to an entity that is controlling/operating payment card transaction processing system 100 and/or payment network 112 of FIG. 1. The entity may customize vendor application framework 204 to create a GFT service for the transfer of files/data between entities of payment card transaction processing system 100 (e.g., merchant 106, acquiring bank 110, issuing bank, and payment network 112).

Vendor application framework 204 may have built thereon, a custom software application component A (206) that depends on library A v1.0 (208). Custom software application component A may be, in the file transfer context, a custom file validation component that can be used for, e.g., validating/authenticating the content(s), origin, etc. of a file(s) to be transferred within payment card transaction processing system 100 (e.g., between one of merchant 106, issuing bank 118, acquiring bank 110, and payment network 112). Custom component B (210) may be another aspect of application program 202. In accordance with one embodiment, custom component B (210) may be a custom encryption component that depends upon another library, i.e., library B v3.0 (212), utilized for encrypting transferred files within payment transaction processing system 100.

During a technical refresh (e.g., vendor upgrade), third-party vendor may develop a new version of vendor application framework 204 resulting in vendor application framework v6.0 (304). Library dependencies may have changed with this new version of vendor application framework 304. For example, vendor application framework 304 may change the previous dependency on library A v1.0 (208) to library A v2.0 (308). Thus, library A v1.0 (208) previously relied upon by custom component A (206) no longer exists as expected by custom component A (206). That is, if custom component A (206) were to load library A to make certain calls, library A v2.0 (308) may no longer have the requisite methods/classes that custom component A (206) relies upon (but previously was able to call with library A v1.0 (208)). It should be noted that a class loader in the JRE may only load a single version of a library at any one time, i.e., it cannot distinguish between different versions of libraries. That is, library A v1.0 (208) and library A v2.0 (308) are incompatible.

As another example, in developing vendor application framework v6.0 (304), the third-party vendor may have implemented a new or additional feature(s)/functionality. To support this new feature(s)/functionality, the third-party vendor may have created a new dependency on library B v2.0 (312). However, in vendor application framework v5.0 (204), custom component B (210) relied upon a more recent version of library B, i.e., library B v3.0 (212). With the new dependency on library B v2.0 (312), it may be that the methods/classes required by custom component B (210) are not supported in the earlier version, i.e., library B v2.0 (312). Moreover, and not only is custom component B (210) no longer operational, it may be that application program 202 based on vendor application framework v6.0 (304) would not be operable using library B v3.0 (212).

The impact of the above scenarios is that application program 202 is put at risk. Without some form of remediation, the vendor application framework and operating system will drop from support. Moreover, falling behind on patches could cause the program to run afoul of industry standards. For example, failure to keep up to date on patches could cause application program 202 to violate the Payment Card Industry Data Security Standard (PCI DSS).

To address the above issues with incompatible libraries, various embodiments of the present disclosure provide a mechanism for isolating conflicting components in separate runtime environments (e.g., JRE) thereby allowing the would-be conflicting components to use distinct versions of libraries that would otherwise conflict in a conventional monolithic software architecture. That is, components, e.g., custom components, of an application may be relegated to separate program address spaces resulting in a segmented yet still monolithic architecture, and called via inter-process communication. To achieve this functionality, APIs are exposed between components using a Java Remote Method Invocation (RMI) interface. The Java RMI is an API that performs the object-oriented equivalent of remote procedure calls (RPC) with support for direct transfer of serialized Java classes and distributed garbage collection.

By moving an application/application component into a separate process space, that application/application component is free to rely upon any version of any library regardless of the third-party vendor's choice in library. A program address space can refer to memory space in which, e.g., a thread runs, and a thread can be thought of as a flow of control within a program. Accordingly, the addition of a new library and/or a different version of a library has no impact to an application/application component running in a separate program address space. Moreover, testing related to library changes in an application can exclude the potential impact to vendor frameworks.

Figure 4:
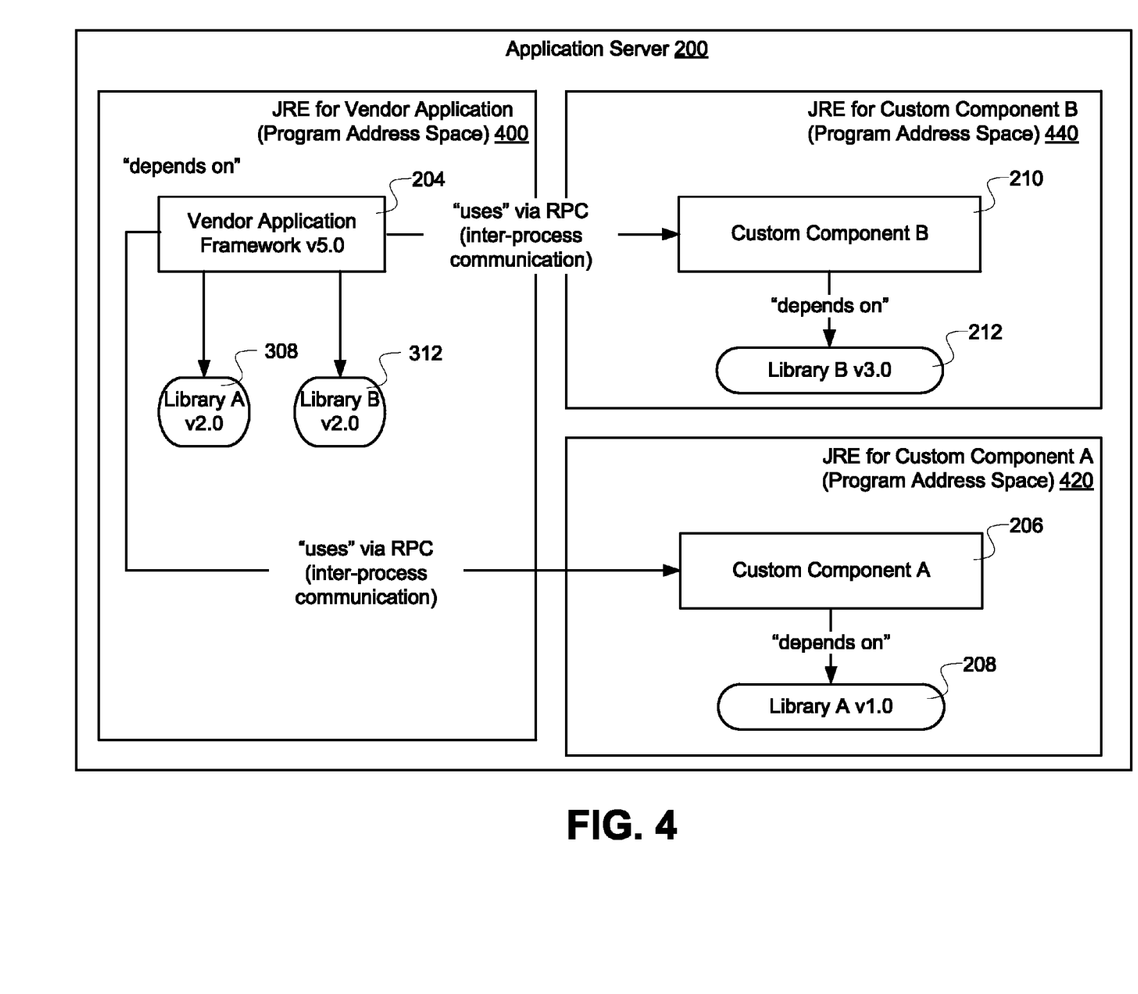
FIG. 4 illustrates an example of the monolithic architecture of FIG. 2 in which a segmented architecture is utilized to implement the application functionality in accordance with various embodiments of the present disclosure.

FIG. 4 is an example of a monolithic architecture in which a segmented architecture is utilized to implement application functionality in accordance with various embodiments of the present disclosure. In keeping with the previous examples illustrated in FIGS. 2 and 3, and described above, vendor application framework v5.0 (204) may be, e.g., a secure transport vendor application framework. As before, vendor application framework 204 may provide certain generic file transport functionality to an entity that is controlling/operating payment card transaction processing system 100 and/or payment network 112 of FIG. 1. The entity may customize vendor application framework v5.0 (204) to create/support a GFT service for the transfer of files/data between entities of payment card transaction processing system 100 (e.g., merchant 106, acquiring bank 110, issuing bank, and payment network 112).

However, and unlike the examples illustrated in FIGS. 2 and 3, application server 200 may be segmented into separate program address spaces. That is, vendor application framework v5.0 (204) can reside in first program address space 400 in which first JRE is held.

Vendor application framework v5.0 (204) may have built thereon, a custom software application component A (206) that depends on library A v1.0 (208). Custom software application component A may be, in the file transfer context, a custom file validation component that can be used for, e.g., validating/authenticating the content(s), origin, etc. of a file(s) to be transferred within payment card transaction processing system 100 (e.g., between one of merchant 106, issuing bank 118, acquiring bank 110, and payment network 112). Like vendor application framework v5.0 (204), custom component A (206) and library A v1.0 (206) upon which it depends may reside in a second JRE at a second program address space 420.

Custom component B (210) may be another aspect of application program 202, and may be a custom encryption component that depends upon library B v3.0 (212), utilized for encrypting transferred files within payment transaction processing system 100. Like vendor application framework v5.0 (204) and custom component A (206), custom component B (210) may reside in a third program address space 440 in which a third JRE is implemented.

Because the vendor application framework v5.0 (204), custom component A (206), and custom component B (210) reside in separate program address spaces 400, 420, and 440, respectively, dependencies on libraries remain distinct. That is, even if a vendor were to introduce new dependencies or alter dependencies to its own framework, there would be no impact to custom component A (206) or to custom component B (210). Indeed, as illustrated in FIG. 4, by virtue of residing in program address space, a change in dependence to library A v2.0 (308) and/or a new dependency on library B v2.0 (312) can occur and/or can be created without affecting custom component A (206) or custom component B (210). Unlike the example of FIG. 2, which results in one or more incompatibilities between one or more libraries, custom component A (206) can maintain its dependence on library A v1.0 (208). Likewise, custom component B (210) can maintain its dependence on library B v3.0 (212).

Moreover, inter-process communications are effectuated between the distinct first, second, and third JRE. That is, the vendor application framework can use, via an RMI call, custom component A (206), in this example, a custom file validation component (which in turn can load library A v1.0 (208) to make the necessary calls) without the issue of incompatible libraries (library A v1.0 (208) and library A v2.0 (308)). In a similar manner, the vendor application framework can use, via an RMI call, custom component B (210), in this example, a custom encryption component (which in turn can load library B v3.0 (212) without issue (i.e., incompatibility with library B v2.0 (312) (which is relied upon by the vendor application framework). Despite isolating each process in its own program address space, each process/application component can operate/act together as a monolithic application running on application server 200.

Figure 5:
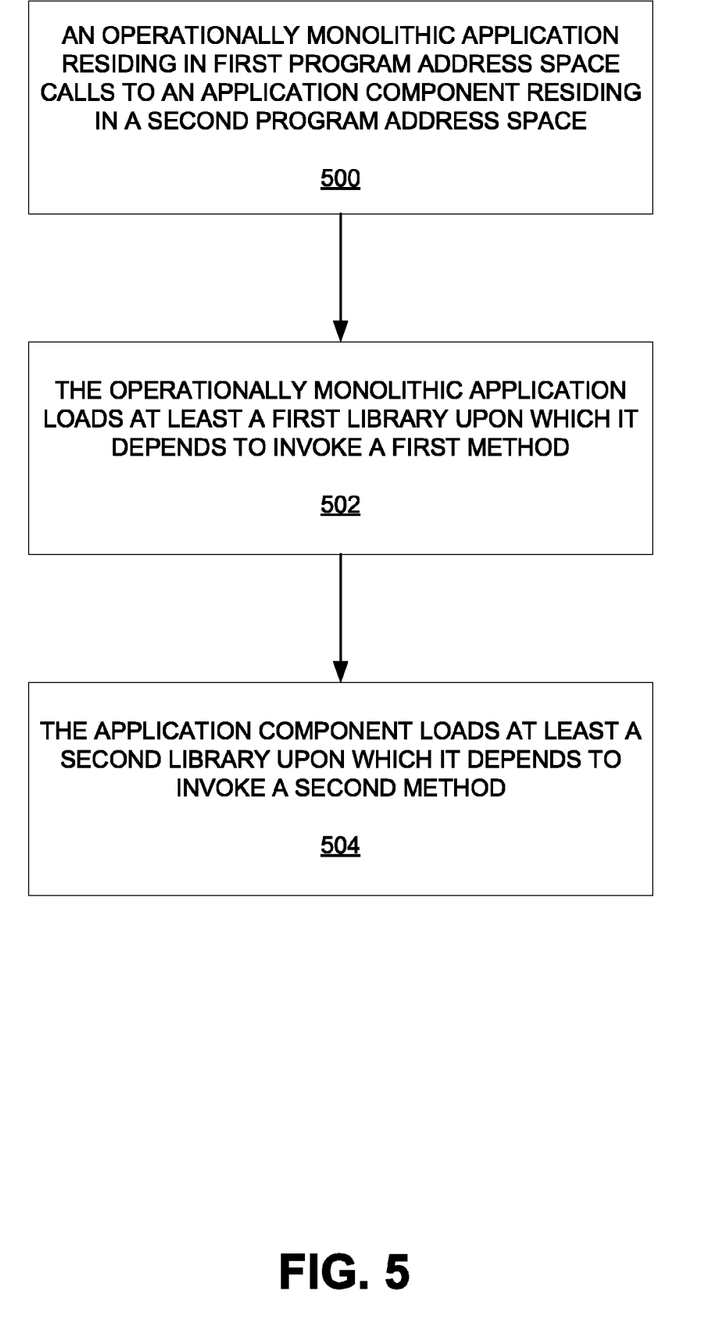
FIG. 5 is a flowchart illustrating example processes performed in executing an application using isolated libraries in accordance with various embodiments of the present disclosure.

FIG. 5 is a flowchart illustrating example processes that can be performed in order to execute one or more applications or application components in a segmented architecture in accordance with various embodiments of the present disclosure. At operation 500, an operationally monolithic application residing in a first program address space makes a call to an application component residing in a second program address space. At operation 502, the application loads at least a first library upon which it depends to invoke a first method. The first library is resident in the first program address space. At operation 504 the application component loads a second library upon which it depends to invoke a second method. The second library is resident in the second program address space.

Encapsulating one or more application components and setting up an application service under their own JVM (e.g., on an application server) results in an API running with the same exposed methods used to call the application components (using RMI calls to access the application components). That is, and from within a vendor application framework, RMI calls out to the one or more application components can be performed and the application components can be invoked in nearly the same way as would be done conventionally (when bounded by same JRE). In this way, any custom functionality can be built into a standalone RMI library, and the vendor application framework can make calls from the vendor application framework. Each custom functionality (application component) can rely on whatever version of a library it desires to depend upon (completely independent from each other from a compatibility standpoint). Standing up each process in its own program address space, but allowing interprocess communication between the processes to form one cohesive system (with each component responsible for a particular service having its own library(ies) resident in their own respective program address space) avoids any potential incompatibility(ies) between library versions.

It should be noted that although various embodiments of the present disclosure have been presented and described in the context of payment card transaction file/data transfer, the concept of a monolithic application having a segmented application architecture is generally applicable, and other embodiments are contemplated for implementation in any other context to prevent or resolve any deleterious impact to applications dependent upon an application framework. Various embodiments can also be used to isolate components and build a service-based architecture. For example, various embodiments can be applied to the context of multimedia tasks, where different programs may require different versions of API collections for handling multimedia tasks running on an installed operating system. Moreover, although various embodiments have been described in the context of Java-based applications, other programming schema/languages can be utilized in accordance with other embodiments. Because various embodiments contemplate utilizing a segmented architecture, where applications/application components execute in their own address space, each piece of the architecture may depend on its own version of the API collection. One monolithic system/entity is segmented, yet can still operate as one logical entity capable of running different versions of tasks.

Figure 6:
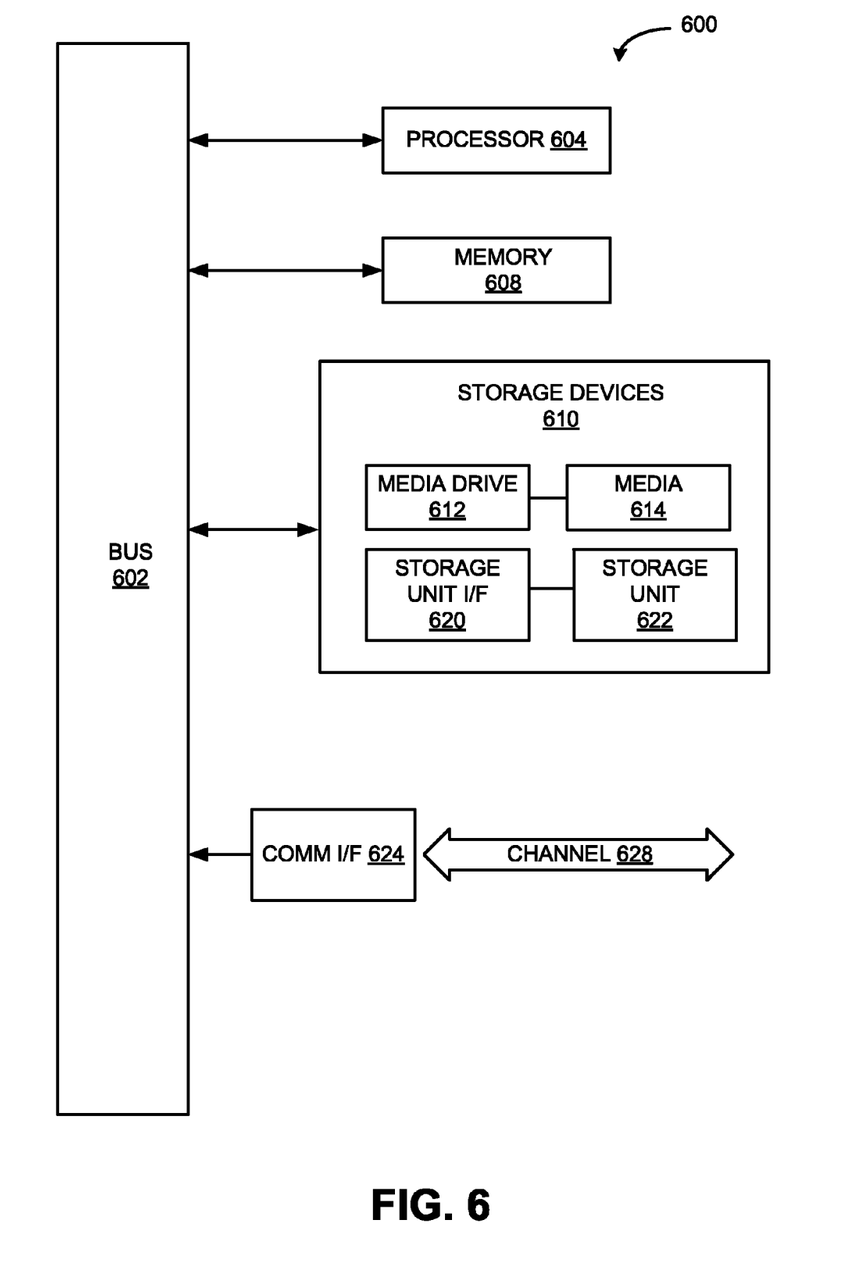
FIG. 6 illustrates an example computing component that may be used in implementing features of various embodiments of the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

FIG. 6 illustrates an example computing component 600, an example of which may be a processor for executing the business ecosystem tool used to implement various features and/or functionality of the systems and methods disclosed in the present disclosure. Computing component 600 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 600 might include, for example, one or more processors, controllers, control components, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing component 600 or to communicate externally.

Computing component 600 might also include one or more memory components, simply referred to herein as main memory 608. For example, preferably random access memory (RAM) or other dynamic memory might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage devices 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage devices 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot, a PCMCIA slot and card, and other fixed or removable storage units 622 and interfaces 620 that allow software and data to be transferred from the storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting.

As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
    calling, by an operationally monolithic application residing in a first program address space of an application server of a non-transitory computer-readable medium, to an application component residing in a second program address space of the non-transitory computer-readable medium;
    loading, by the operationally monolithic application, at least a first library upon which it depends to invoke a first method; and
    concurrently loading, by the application component, at least a second library upon which it depends to invoke a second method, wherein the first library is a different version of the second library.

2. The method of claim 1, further comprising implementing a first runtime environment in the first address space.

3. The method of claim 2, further comprising implementing a second runtime environment in the second address space.

4. The method of claim 1, wherein at least one of the first method or a first class supported by the first library is not supported by the second library.

5. The method of claim 1, wherein at least one of the second method or a second class supported by the second library is not supported by the first library.

6. The method of claim 1, wherein the operationally monolithic application comprises an application programming interface.

7. The method of claim 6, further comprising calling the application component via a remote procedure call.

8. The method of claim 7, wherein the calling of the application component via the remote procedure call comprises an inter-process communication.

9. A non-transitory computer-readable medium having computer executable program code embodied thereon, the computer executable program code configured to cause a computer system to:
    execute an operationally monolithic application residing in a first program address space of the non-transitory computer-readable medium, wherein executing of the operationally monolithic application comprises:
        calling to an application component residing in a second program address space of the non-transitory computer-readable medium;
        loading, by the operationally monolithic application, at least a first library upon which it depends to invoke a first method; and
        concurrently loading, by the application component, at least a second library upon which it depends to invoke a second method, wherein the first library is a different version of the second library.

10. The non-transitory computer-readable medium of claim 9, wherein the computer executable program code is configured to further cause the computer system to implement a first runtime environment in the first address space.

11. The non-transitory computer-readable medium of claim 10, wherein the computer executable program code is configured to further cause the computer system to implement a second runtime environment in the second address space.

12. The non-transitory computer-readable medium of claim 9, wherein at least one of the first method or a first class supported by the first library is not supported by the second library, and wherein at least one of the second method or a second class supported by the second library is not supported by the first library.

13. The non-transitory computer-readable medium of claim 9, wherein the operationally monolithic application comprises an application programming interface.

14. The non-transitory computer-readable medium of claim 6, wherein the computer executable program code is configured to further cause the computer system to call the application component via a remote procedure call.

15. An application server, comprising:
a memory unit comprising at least a first program address space and a second program address space;
a vendor application, wherein the vendor application is dependent upon a first version of a library;
a customized application component, wherein the customized application component is dependent upon a second version of the library, and wherein the vendor application calls the customized application component via inter-process communication during execution, wherein the vendor application executes in a first runtime environment, and wherein the customized application component executes in a second runtime environment such that the first and second versions of the libraries are co-existent within the application server.

16. The application server of claim 15, wherein the customized application component is built upon a vendor application framework.

17. The application server of claim 15, wherein the inter-process communication is achieved via a remote procedure call.

* * * * *

UNITED STATES PATENT AND TRADEMARK OFFICE
CERTIFICATE OF CORRECTION

PATENT NO. : 9,798,537 B2
APPLICATION NO. : 14/853695
DATED : October 24, 2017
INVENTOR(S) : Douglas Paul Forguson, Weihua Zhou and Uday Kumar Survi It is certified that error appears in the above-identified patent and that said Letters Patent is hereby corrected as shown below:

In the Specification

Column 5, Line 15: "offer the transfer" should be -- offer file transfer --.

Column 5, Line 22: "data the transfer" should be -- data file transfer --.

Column 5, Line 25: "FTP tale transfer" should be -- FTP file transfer --.

Column 5, Line 27: "the retention" should be -- file retention --.

Column 5, Line 33: "international incorpo-" should be -- International Incorpo- --.

Column 5, Line 35: "secure the transfer" should be -- secure file transfer --.

Signed and Sealed this
Thirty-first Day of July, 2018

Andrei Iancu
*Director of the United States Patent and Trademark Office*